(12) United States Patent
Mukherjea et al.

(10) Patent No.: US 8,363,570 B2
(45) Date of Patent: Jan. 29, 2013

(54) SYSTEMS AND METHODS FOR FINDING STAR STRUCTURES AS COMMUNITIES IN NETWORKS

(75) Inventors: Sougata Mukherjea, New Delhi (IN); Amit A. Nanavati, New Delhi (IN); Usha N. Raghavan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/697,238

(22) Filed: Jan. 30, 2010

(65) Prior Publication Data

US 2011/0188405 A1 Aug. 4, 2011

(51) Int. Cl.
*H04L 12/28* (2006.01)

(52) U.S. Cl. ........................... 370/255; 370/256

(58) Field of Classification Search .............. 370/254, 370/255, 256
See application file for complete search history.

(56) References Cited

U.S. PATENT DOCUMENTS

| | | | | |
|---|---|---|---|---|
| 5,140,585 | A * | 8/1992 | Tomikawa | 370/354 |
| 6,437,804 | B1 | 8/2002 | Ibe et al. | |
| 7,454,488 | B2 * | 11/2008 | Wechter et al. | 709/223 |
| 7,953,594 | B2 * | 5/2011 | Jeong et al. | 704/10 |
| 7,961,714 | B1 * | 6/2011 | Watson et al. | 370/352 |
| 8,234,297 | B2 * | 7/2012 | He | 707/770 |
| 2010/0058118 | A1 * | 3/2010 | Yamaoka | 714/48 |
| 2010/0103940 | A1 * | 4/2010 | van Greunen et al. | 370/400 |
| 2012/0059859 | A1 * | 3/2012 | Jiao et al. | 707/797 |

FOREIGN PATENT DOCUMENTS

| | | |
|---|---|---|
| EP | 1556819 | 11/2008 |
| EP | 2028792 | 2/2009 |
| WO | 2004/027552 | 4/2004 |
| WO | WO/2008/091914 A1 | 7/2008 |

OTHER PUBLICATIONS

Xiao, Liping et al, "Approach to Node Ranking in a Network Based on Topology Potential", Institute of Command Automation, Beijing, China.
Sheng, Min et al, "Critical Nodes Detection in Mobile Ad Hoc Network", Proceedings of the 20th International Conference on Advanced Information Networking and Applications (AINA'06).
Arulselvan, Ashwin et al, "Detecting Critical Nodes in Sparse Graphs", www.optimization-online.org/DB_File/2008/09/2097.pdf.
Aslam, J.A., Pelekhov, E., Rus D: , "The Star Clustering Algorithm for Information Organization", "Book Chapter" In: Editor Kogan, Jacob, Nicholas, Charles, Teboulle, Marc. Author: Aslam, J.A., Pelekhov, E., Rus, D: "Grouping Multidimensional Data", Jan. 1, 2006, Springer Berlin Heidelberg, Berlin, pp. 1-23, XP002630028, ISBN: 978-3-540-28349-2.
D. Chakrabarti et al.: "Graph Mining: Laws, Generators and Algorithms", ACM, 2 Penn Plaza, Suite 701—New York USA, vol. 38, Mar. 1, 2006, pp. 1-78, XP040039571, USA.

(Continued)

*Primary Examiner* — Chuong T Ho
(74) *Attorney, Agent, or Firm* — Ference & Associates LLC

(57) ABSTRACT

Embodiments of the invention provide systems, methods, apparatuses and program products providing methods to define and find relationships in network environments. Embodiments of the invention utilize relationship definitions for defining network environment relationships as star structures within the network of interest and automatically discover these star structures in networks.

22 Claims, 7 Drawing Sheets

OTHER PUBLICATIONS

Reynaldo Gil-Garcia et al: "Hierarchical Star Clustering Algorithm for Dynamic Document Collections", Sep. 9, 2008, Progress in Pattern Recognition, Image Analysis and Applications; [Lecture Notes in Computer Science], Springer Berlin Heidelberg, Berlin, Heidelberg, pp. 187-194, XP019110895, ISBN: 978-3-540-85919-2.

PCT International Search Report (Form PCT/ISA/210), PCT/EP2011/051030, International Searching Authority/European Patent Office, Mar. 25, 2011, 3 pages.

* cited by examiner

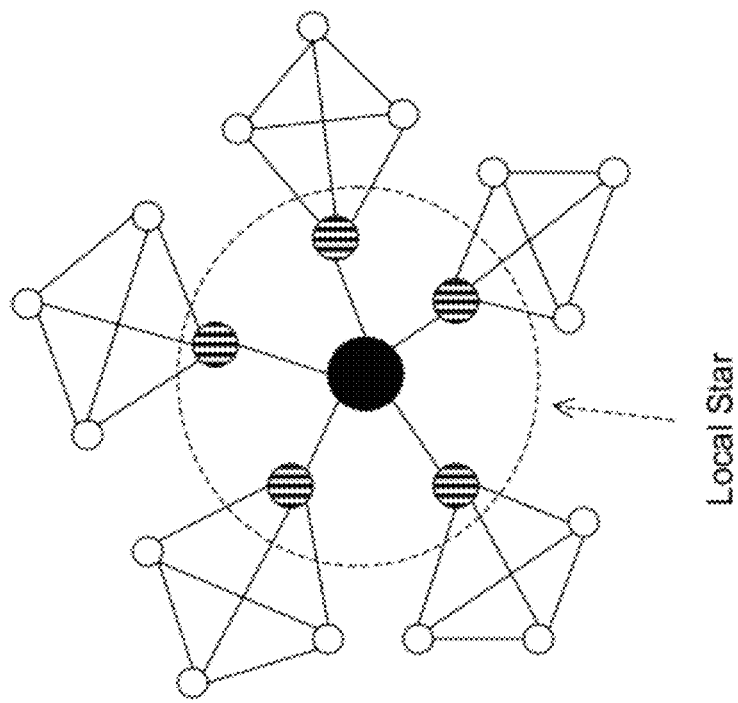
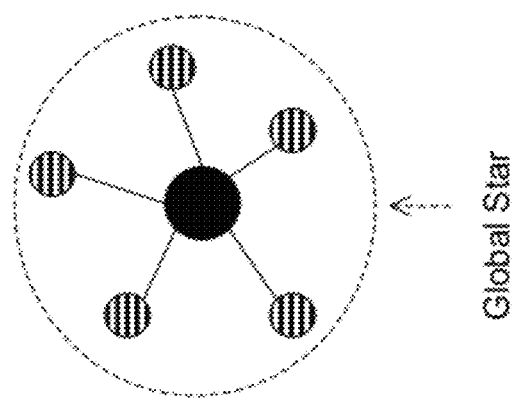
FIG. 4

FIG. 5 Pruned Star

SYSTEMS AND METHODS FOR FINDING STAR STRUCTURES AS COMMUNITIES IN NETWORKS

BACKGROUND

The subject matter described herein generally relates to defining and detecting relationships between nodes in a network environment. As described herein, a network, a network environment (and the like) may include but is not necessarily limited to computer networks, social networks, chemical networks, biological networks, et cetera.

A network can be considered as a collection of nodes connected via edges in some way. As a non-limiting example, an Internet based network can be defined as including nodes, such as web pages, connected via edges, for example hyperlinks connecting the web pages. As another non-limiting example, a bio-chemical network can be defined as including nodes, such as molecules, connected via edges, for example known relations (such as chemical binding or reactivity) between the nodes of the network. As yet another non-limiting example, a call network can be defined as including nodes, such as phone numbers and/or people, connected via edges, for example the presence of a contact (such as a placed call or text message sent) between the nodes in the call network.

There is a large amount of information available regarding networks. For example, there is a large amount of call information that exists regarding which users/numbers have called others within a given telecommunications network. Although the information describing the network exists, leveraging it for maximum value is often difficult, sometimes as a direct result of the large amount of information. Thus, while the information describing the relationships of nodes within the network have clear value, discovering these relationships within existing network data is often difficult.

BRIEF SUMMARY

Embodiments of the invention provide systems, methods, apparatuses and program products providing methods to define and find relationships in network environments. Embodiments of the invention utilize relationship definitions for defining network environment relationships as star structures within the network of interest and automatically discover these star structures in networks (such as social, technological, biological, chemical, et cetera). These star structures are important, in and among other reasons, for their semantics and the roles that the "hub" and "spokes" of the star structures play in various network contexts. Thus, embodiments of the invention, for example, enable a user to identify influential people/numbers in a telecom network as hubs which contact other nodes (spokes) within the network. Once these star structures have been identified, a user may take advantage of the network information, for example by using the hub as a contact or entry point for influencing other nodes throughout the network.

In summary, one aspect of the invention provides a method comprising: accessing network data stored in a storage device; extracting information corresponding to nodes and edges within the network data; selecting one or more candidate group of nodes; calculating a star measure for the one or more candidate group of nodes; determining if the star measure for the one or more candidate group of nodes does not exceed a predetermined threshold; and defining one or more star structures in response to the star measure for the one or more candidate group of nodes not exceeding the predetermined threshold.

Another aspect of the invention provides an apparatus comprising: one or more processors; and a computer readable storage medium having a program of instructions embodied therewith and executable by the one or more processors, the program of instructions comprising: computer readable program code configured to access network data stored in a storage device; computer readable program code configured to extract information corresponding to nodes and edges within the network data; computer readable program code configured to select one or more candidate group of nodes; computer readable program code configured to calculate a star measure for the one or more candidate group of nodes; computer readable program code configured to determine if the star measure for the one or more candidate group of nodes does not exceed a predetermined threshold; and computer readable program code configured to define one or more star structures in response to the star measure for the one or more candidate group of nodes not exceeding the predetermined threshold.

A further aspect of the invention provides a computer program product comprising: a computer readable storage medium having computer readable program code embodied therewith, the computer readable program code comprising: computer readable program code configured to access network data stored in a storage device; computer readable program code configured to extract information corresponding to nodes and edges within the network data; computer readable program code configured to select one or more candidate group of nodes; computer readable program code configured to calculate a star measure for the one or more candidate group of nodes; computer readable program code configured to determine if the star measure for the one or more candidate group of nodes does not exceed a redetermined threshold; and computer readable program code configured to define one or more star structures in response to the star measure for the one or more candidate group of nodes not exceeding the predetermined threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates exemplary star types according to an embodiment.

DETAILED DESCRIPTION

Figure 1:
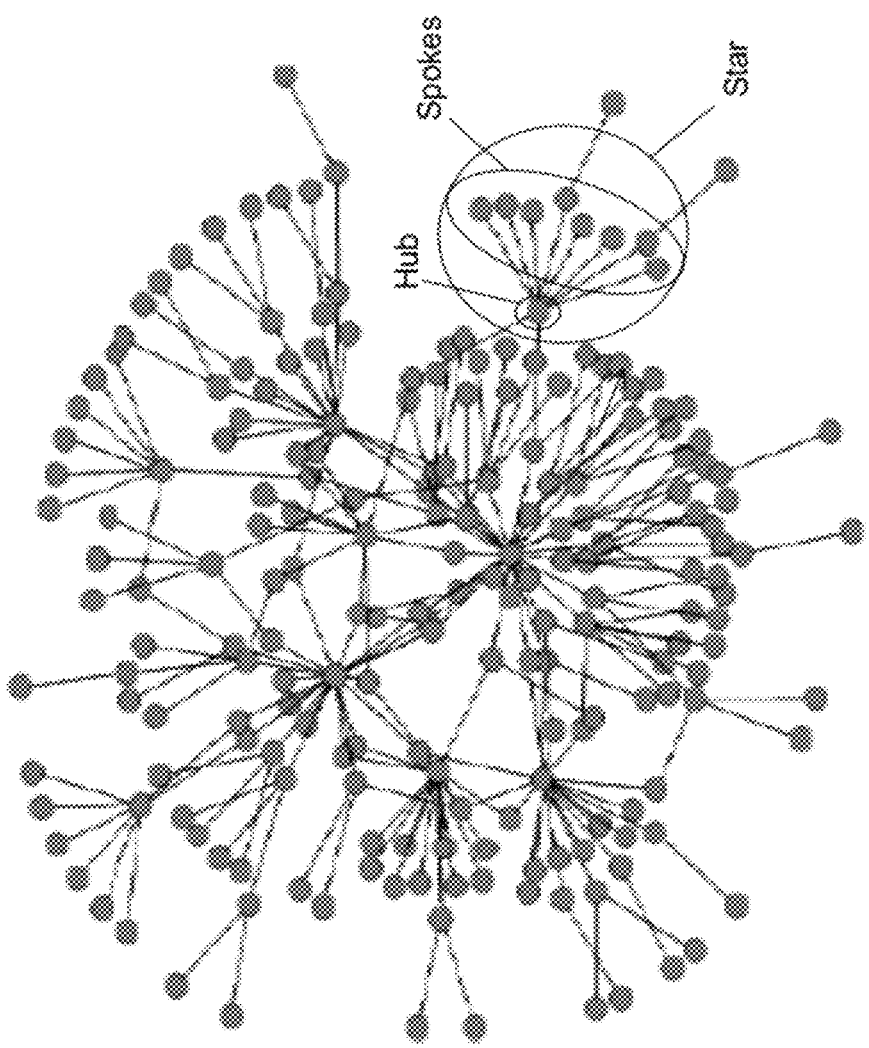
FIG. 1 illustrates an exemplary network having star structures therein according to an embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Network data regarding nodes, whether the nodes represent callers in a communications network, molecules in a physiological or biochemical system, chemicals in an industrial reaction process, pharmaceuticals that cause adverse interactions with one another, or the like, can contain valuable information. Considering that there is already a vast amount of data available about how nodes in a network are related, identifying interesting and potentially important relationships within a network of nodes has real value. For example, network data can contain information about an important person that is related/communicating with others in a network, which in turn may be useful for targeting information for distribution throughout the network.

The inventors have recognized that given existing network data, it can be difficult to identify important node(s) within the network that may be related to one another in an interesting and important way. As a non-limiting example, it may be difficult to identify a central caller that is contacting many other callers, for example a tele-marketer, even if one has access to all the calling information. In this regard, the tele-marketer, or central node, can be considered a "hub" of a star structure within the network, connected to many other nodes ("spokes") via edges, or calls made in this example.

Accordingly, embodiments of the invention provide definitions for star structures within a network and allow automatic analysis of the network data to identify these star structures within the network. Given a properly identified star structure, one is enabled to perform further analysis of the relationship within the star structure, unobstructed by the vast amount of additional network data.

The description now turns to the figures. The illustrated embodiments of the invention will be best understood by reference to the figures. The following description is intended only by way of example and simply illustrates certain selected exemplary embodiments of the invention as claimed herein.

Referring to FIG. 1, there is illustrated an exemplary network. The network is composed of many nodes connected (by edges). The nodes, as described herein, can be any of a wide variety, for example users calling one another or sending text messages to one another, or users of a social networking site, where the edges represent some relationship between the nodes, for example calls, texts, friend links, et cetera. Interestingly, it can be seen the network contains one or more star structures, where a hub node connects the spokes within the star structure.

The network illustrated in FIG. 1 may be for example a social network of interconnected social networking web sites. In a social networking context, the hub of the star structure may represent a user web page and the spokes (not all spokes are circled) may represent the web pages of the hub user's friends. The hub node indicated therefore may be of particular interest, for example identifying a user that has connections to many others within the network or connections with a particular subset of nodes within the network.

Figure 2:
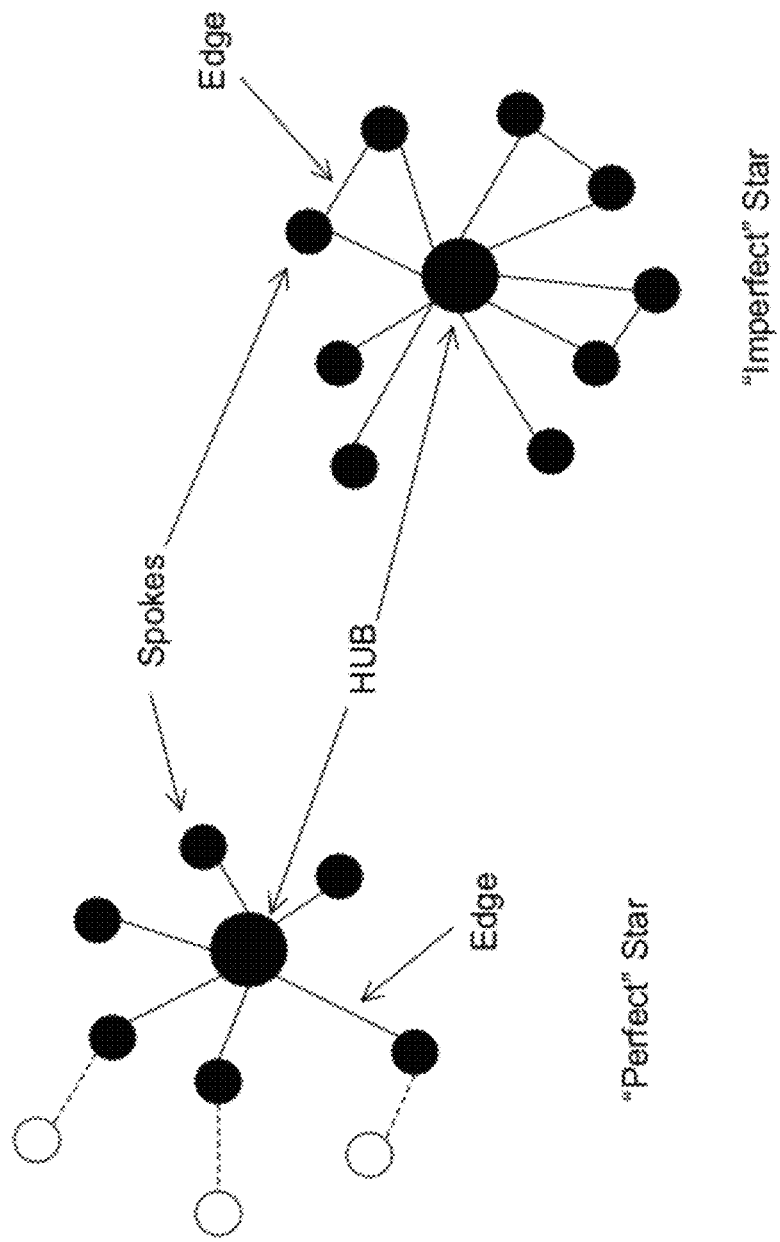
FIG. 2 illustrates exemplary star structure types according to an embodiment.

In FIG. 2 are illustrated various exemplary star structures defined utilizing embodiments of the invention. A "perfect" star can be defined as having a hub node that is the sole, common connection between the spokes of the star structure. The spokes may have additional connections, but not with other spokes of the star structure. Thus, the hub in the perfect star is the sole connection binding the spokes together. An "imperfect" star can be defined as having a hub connecting spokes, with one or more of the spokes having connections to one another. Thus, the imperfect star hub is not the sole connection that binds the spokes to one another, yet it does represent a common connection or edge.

In order to define a star structure properly within a network, and in turn to be enabled to identify the star structures within the network, a star measure is introduced. Essentially a star measure is utilized by embodiments of the invention to identify stars, wherein if the star measure does not exceed a threshold value (where the threshold can be tuned as appropriate for the context), a star structure is identified.

Figure 3:
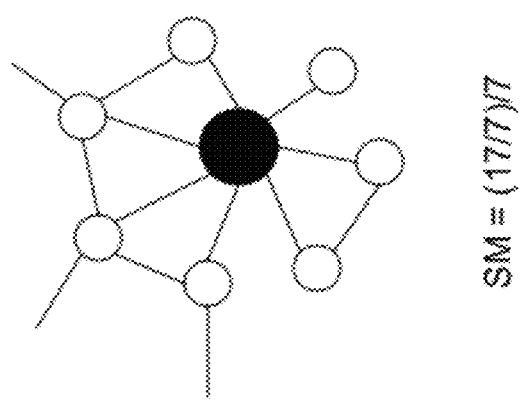
FIG. 3 illustrates an exemplary star measure according to an embodiment.

Illustrated in FIG. 3 is an exemplary star measure according to an embodiment of the invention. A star measure (SM) according to an embodiment of the invention can be defined as:

$$SM = \frac{\sum \frac{d_i}{d}}{d}$$

where $d_i$ is the number of degrees (edges) of the neighbor nodes of the hub, and d is the degree (edges) of the central node/hub. Thus, the SM represents the average degree of the neighbors divided by the degree of the central node hub. For the exemplary star illustrated in FIG. 3, the SM is:

$$SM = \frac{\frac{17}{7}}{7}$$

The value of the star measure is an expression of the degrees of relation between the spokes and the central hub. Thus, given a node and its degree, d, the SM takes values greater than or equal to 1/d. It should be noted that larger stars might have smaller SM's than smaller stars.

The star structures within the network can take a variety of forms. Illustrated in FIG. 4 are an exemplary global star and an exemplary local star. Considering the global star, it can be defined as a star structure where the hub is connected to all spokes, that is, has a global central node. The local star, in contrast, is defined as having a locally central node or hub, that is, the hub binds spokes locally, but distant nodes may be separated from the hub by several degrees. Global stars are of interest for example because they may represent a very important node, for example a call center in a call network. Local stars are of interest for example because they may represent a node of local importance, for example a particular node having influence on immediately surrounding nodes.

Global stars and local stars can be defined by measures, where the global star measure (GSM) is defined by:

$$GSM = \frac{\sum \frac{d_i}{d}}{d};$$

and the local star measure (LSM) is defined by:

$$LSM = \frac{\sum \frac{d_i'}{d}}{d},$$

where $d_i' \leq d_i$ for all i. If the GSM is less than the threshold, then necessarily LSM is less than the threshold. Thus, a node and its neighbors (spokes) form a global star if GSM<threshold, and a node and its neighbors forms a local star if GSM>threshold and LSM<threshold.

Figure 5:
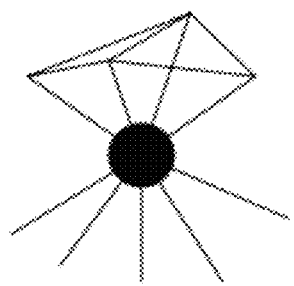
FIG. 5 illustrates an exemplary pruned star according to an embodiment.

The central node or hub and its surrounding spokes define a star structure. Thus, the size of the star structure can dictate its star measure. In order to drill down within the network data, pruned star structures can be defined by embodiments of the invention to refine and identify star structures with greater ganularity. Illustrated in FIG. 5 is a pruned star structure. As illustrated, a pruned star structure consists of a central hub and its spokes, reduced incrementally by removing the neighbor/spoke with the highest degree, one by one. Thus, a smaller (pruned) and "perfect" star identified can have a higher LSM than a larger and "imperfect" star.

Figure 6:
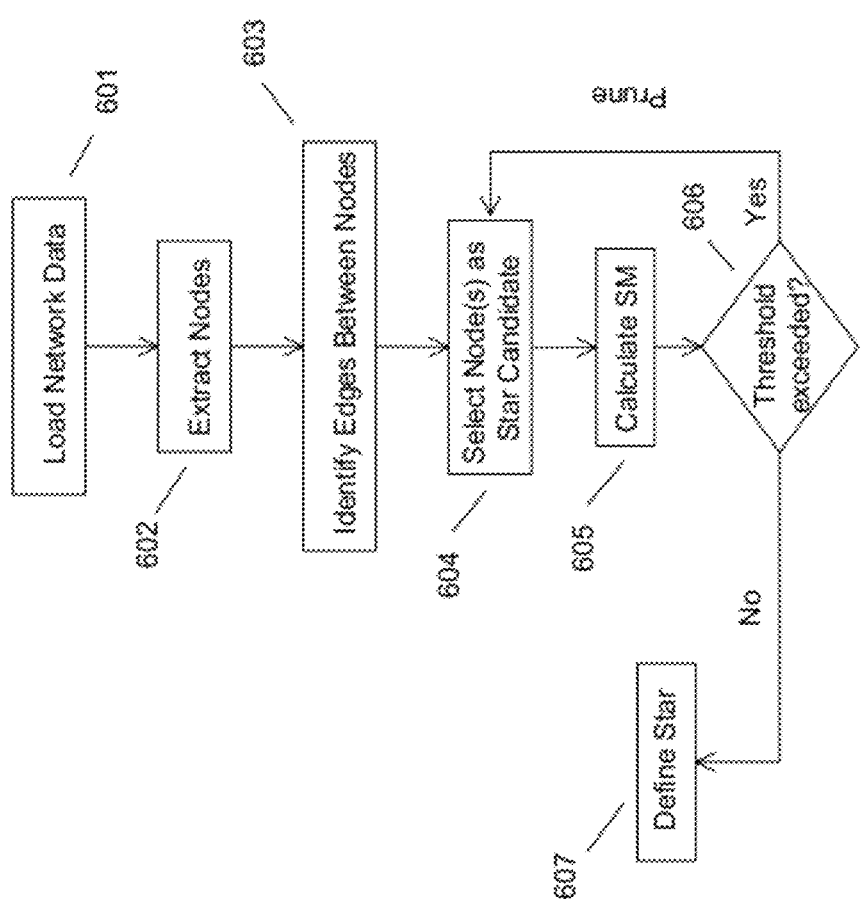
FIG. 6 illustrates an exemplary method for identifying star structures according to an embodiment.

FIG. 6 illustrates an exemplary method for identifying star structures according to an embodiment of the invention. At 601 network data, including node and edge information, is loaded into the system. The nodes are extracted at 603 and their associated edges processed to identify connections between the nodes at 604. Thus, a node can be analyzed to determine if it represents a hub of a star structure. The system processes select nodes as candidate group(s) that may represent star structures by calculating the star measure of the candidate group(s) at 605. The system determines if the star measure for the candidate structure exceeds a predetermined threshold (which can be user defined/tuned) at 606. If the threshold is not exceeded, the star structure has been identified within the network and can be defined for appropriate display to the user (such as a network graph, as depicted in FIG. 1). If the threshold is exceeded, the system may begin the pruning process on the star candidate group in order to recalculate and possibly identify a local star structure.

It will be readily understood by those having ordinary skill in the art that embodiments of the invention may be implemented using one or more computer systems. In this regard, a non-limiting and exemplary computer system is described herein.

Figure 7:
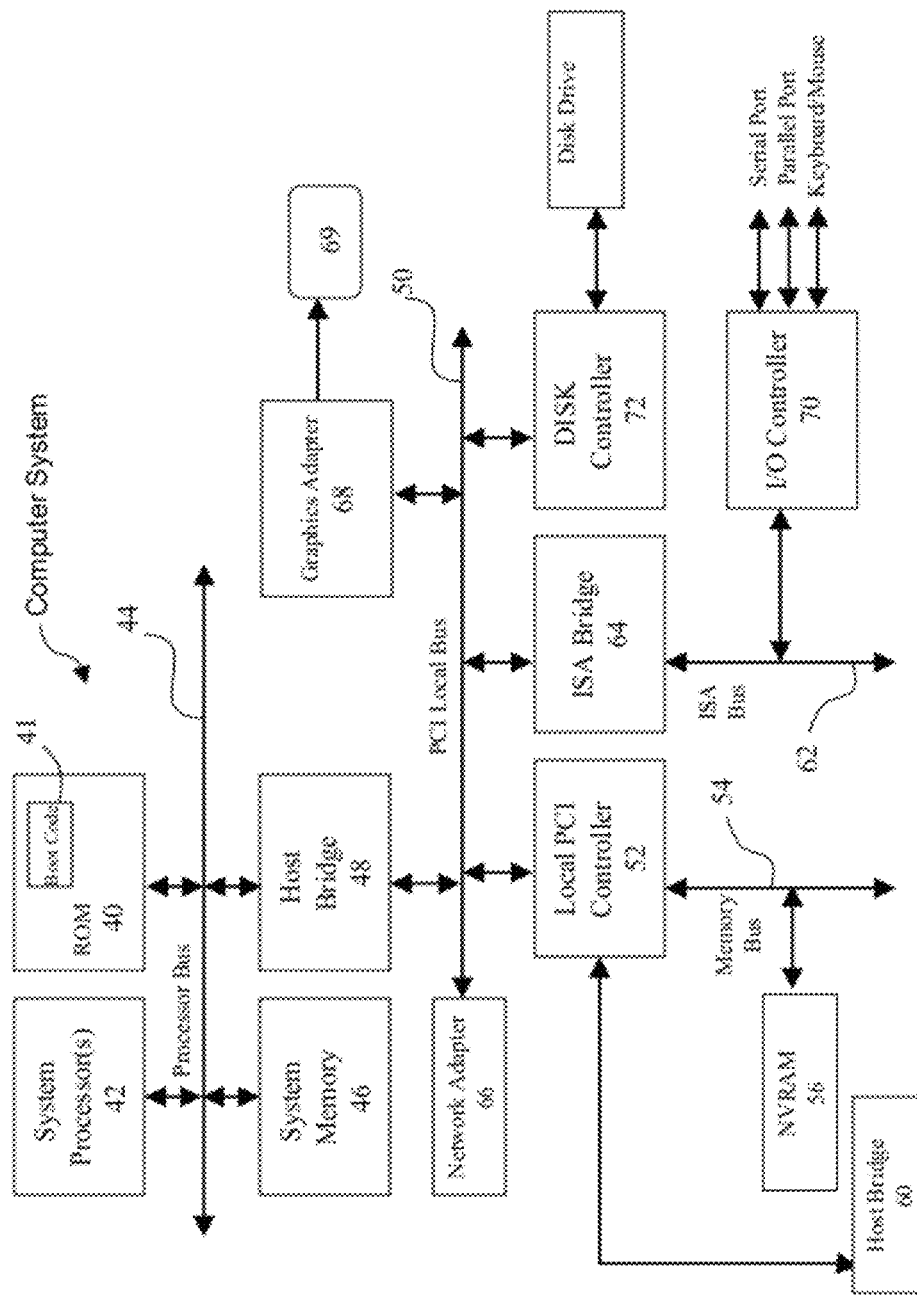
FIG. 7 illustrates an exemplary computer system according to an embodiment.

Referring now to FIG. 7, there is depicted a block diagram of an illustrative embodiment of a computer system. The illustrative embodiment depicted in FIG. 7 may be an electronic device such as desktop or workstation computer. As is apparent from the description, however, the embodiments of the invention may be implemented in any appropriately configured device, as described herein.

As shown in FIG. 7, computer system includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system further includes Industry Standard Architecture (ISA) bus 62, which is coupled to PCI local bus 50 by ISA bridge 64. Coupled to ISA bus 62 is an input/output (I/O) controller 70, which controls communication between computer system and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   accessing network data stored in a storage device;
   extracting information corresponding to nodes and edges within the network data;
   selecting one or more candidate group of nodes;
   calculating a star measure for the one or more candidate group of nodes;
   determining if the star measure for the one or more candidate group of nodes does not exceed a predetermined threshold;
   defining one or more star structures in response to the star measure for the one or more candidate group of nodes not exceeding the predetermined threshold;
   wherein the one or more star structures comprise one or more of a local star structure and a global star structure.

2. The method according to claim 1, wherein calculating a star measure for the one or more candidate group of nodes further comprises:
   identifying a hub node;
   identifying one or more neighbor nodes;
   determining an average number of edges for the one or more neighbor nodes;
   determining an average number of edges for the hub node; and
   computing the star measure as the average number of edges for the one or more neighbor nodes divided by the number of edges for the hub node.

3. The method according to claim 1, wherein the one or more star structures comprise a global star structure.

4. The method according to claim 3, wherein, responsive to one or more global star structures being defined, one or more local star structures is identified.

5. The method according to claim 1, further comprising:
   responsive to determining that the star measure for the one or more candidate group of nodes exceeds the predetermined threshold, pruning the one or more candidate group of nodes and re-determining if a star measure for one or more modified candidate group of nodes does not exceed the predetermined threshold.

6. The method according to claim 5, wherein pruning the one or more candidate group of nodes comprises removing a neighbor of a hub node having a highest degree of connectivity to other nodes from the candidate star structure.

7. The method according to claim 6, wherein, responsive to determining a star measure for one or more modified candidate group of nodes does not exceed the predetermined threshold, defining a star structure.

8. The method according to claim 1, wherein the network data comprises one or more of call network data, pharmaceutical network data, and social Internet web site network data.

9. The method according to claim 1, further comprising outputting the one or more star structures to one or more display devices.

10. An apparatus comprising:
one or more processors; and
a computer readable storage medium having a program of instructions embodied therewith and executable by the one or more processors, the program of instructions comprising:
computer readable program code configured to access network data stored in a storage device;
computer readable program code configured to extract information corresponding to nodes and edges within the network data;
computer readable program code configured to select one or more candidate group of nodes;
computer readable program code configured to calculate a star measure for the one or more candidate group of nodes;
computer readable program code configured to determine if the star measure for the one or more candidate group of nodes does not exceed a predetermined threshold;
computer readable program code configured to define one or more star structures in response to the star measure for the one or more candidate group of nodes not exceeding the predetermined threshold;
wherein the one or more star structures comprise one or more of a local star structure and a global star structure.

11. The apparatus according to claim 10, wherein the computer readable program code configured to calculate a star measure for the one or more candidate group of nodes is further configured to:
identify a hub node;
identify one or more neighbor nodes;
determine an average number of edges for the one or more neighbor nodes;
determine a number of edges for the hub node; and
compute the star measure as the average number of edges for the one or more neighbor nodes divided by the number of edges for the hub node.

12. The apparatus according to claim 10, wherein the one or more star structures comprise a global star structure.

13. The apparatus according to claim 12, wherein, responsive to one or more global star structures being defined, one or more local star structures is identified.

14. The apparatus according to claim 10, wherein the computer readable program code further comprises:
computer readable program code configured to, responsive to determining that the star measure for the one or more candidate group of nodes does not exceed the predetermined threshold, prune the one or more candidate group of nodes and re-determining if a star measure for one or more modified candidate group of nodes does not exceed the predetermined threshold.

15. The apparatus according to claim 14, wherein to prune the one or more candidate group of nodes comprises removing a neighbor of a hub node having a highest degree of connectivity to other nodes from the candidate star structure.

16. The apparatus according to claim 15, wherein, responsive to determining a star measure for one or more modified candidate group of nodes does not exceed the predetermined threshold, defining a star structure.

17. The apparatus according to claim 10, wherein the network data comprises one or more of call network data, pharmaceutical network data, and social Internet web site network data.

18. The apparatus according to claim 10, further comprising:
one or more display devices;
wherein the computer readable program code further comprises computer readable program code configured to output the one or more star structures to one or more display devices.

19. A computer program product comprising:
a computer readable storage medium having computer readable program code embodied therewith, the computer readable program code comprising:
computer readable program code configured to access network data stored in a storage device;
computer readable program code configured to extract information corresponding to nodes and edges within the network data;
computer readable program code configured to select one or more candidate group of nodes;
computer readable program code configured to calculate a star measure for the one or more candidate group of nodes;
computer readable program code configured to determine if the star measure for the one or more candidate group of nodes does not exceed a predetermined threshold;
computer readable program code configured to define one or more star structures in response to the star measure for the one or more candidate group of nodes not exceeding the predetermined threshold;
wherein the one or more star structures comprise one or more of a local star structure and a global star structure.

20. The computer program product according to claim 19, wherein the computer readable program code configured to calculate a star measure for the one or more candidate group of nodes is further configured to:
identify a hub node;
identify one or more neighbor nodes;
determine an average number of edges for the one or more neighbor nodes;
determine a number of edges for the hub node; and
compute the star measure as the average number of edges for the one or more neighbor nodes divided by the number of edges for the hub node.

21. A method comprising:
accessing network data stored in a storage device;
extracting information corresponding to nodes and edges within the network data;
selecting one or more candidate group of nodes;
calculating a star measure for the one or more candidate group of nodes;
determining if the star measure for the one or more candidate group of nodes does not exceed a predetermined threshold;
defining one or more star structures in response to the star measure for the one or more candidate group of nodes not exceeding the predetermined threshold;

wherein calculating a star measure for the one or more candidate group of nodes further comprises:

identifying a hub node;

identifying one or more neighbor nodes;

determining an average number of edges for the one or more neighbor nodes;

determining an average number of edges for the hub node; and computing the star measure as the average number of edges for the one or more neighbor nodes divided by the number of edges for the hub node.

22. A computer program product comprising:

a computer readable storage medium having computer readable program code embodied therewith, the computer readable program code comprising:

computer readable program code configured to access network data stored in a storage device;

computer readable program code configured to extract information corresponding to nodes and edges within the network data;

computer readable program code configured to select one or more candidate group of nodes;

computer readable program code configured to calculate a star measure for the one or more candidate group of nodes;

computer readable program code configured to determine if the star measure for the one or more candidate group of nodes does not exceed a predetermined threshold;

computer readable program code configured to define one or more star structures in response to the star measure for the one or more candidate group of nodes not exceeding the predetermined threshold; and wherein the computer readable program code configured to calculate a star measure for the one or more candidate group of nodes is further configured to:

identify a hub node;

identify one or more neighbor nodes;

determine an average number of edges for the one or more neighbor nodes;

determine a number of edges for the hub node; and compute the star measure as the average number of edges for the one or more neighbor nodes divided by the number of edges for the hub node.

* * * * *